(12) United States Patent
Zweber

(10) Patent No.: US 8,113,226 B2
(45) Date of Patent: Feb. 14, 2012

(54) VALVE ASSEMBLIES AND RELATED SYSTEMS AND METHODS

(75) Inventor: Michael J. Zweber, New Prague, MN (US)

(73) Assignee: Restaurant Technologies, Inc., Mendota Heights, MN (US)

( * ) Notice: Subject to any disclaimer, the term of this patent is extended or adjusted under 35 U.S.C. 154(b) by 0 days.

(21) Appl. No.: 12/796,075

(22) Filed: Jun. 8, 2010

(65) Prior Publication Data

US 2010/0243065 A1 Sep. 30, 2010

Related U.S. Application Data

(62) Division of application No. 11/893,972, filed on Aug. 17, 2007, now Pat. No. 7,740,023.

(60) Provisional application No. 60/838,675, filed on Aug. 18, 2006.

(51) Int. Cl.
*F16K 15/04* (2006.01)

(52) U.S. Cl. ............... 137/112; 137/512.3; 137/606; 99/407

(58) Field of Classification Search ............... 137/1, 111, 137/112, 512, 512.3, 606; 99/403, 407
See application file for complete search history.

(56) References Cited

U.S. PATENT DOCUMENTS

| | | | |
|---|---|---|---|
| 1,056,735 A | 3/1913 | Buckingham et al. | |
| 2,809,659 A | 10/1957 | Gillespie et al. | |
| 4,291,719 A | 9/1981 | Lehmann | |
| 4,412,792 A | 11/1983 | LaBorde et al. | |
| 4,642,184 A | 2/1987 | Liepse | |
| 4,831,839 A | 5/1989 | Anderson et al. | |
| 4,872,474 A * | 10/1989 | Middleton et al. | 137/493.8 |
| 4,953,588 A | 9/1990 | Sands | |
| 5,207,242 A | 5/1993 | Daghe et al. | |
| 5,249,511 A | 10/1993 | Shumate et al. | |
| 5,839,360 A | 11/1998 | Williams | |
| 5,893,360 A | 4/1999 | Stoumen et al. | |
| 5,964,258 A | 10/1999 | Schoenbauer | |
| 5,979,498 A | 11/1999 | Zenker et al. | |
| 6,095,037 A * | 8/2000 | Savage et al. | 99/408 |
| 6,330,852 B1 | 12/2001 | Williams et al. | |
| 6,349,736 B1 | 2/2002 | Dunmire | |

(Continued)

OTHER PUBLICATIONS

"U.S. Appl. No. 11/893,972, Notice of Allowance mailed Apr. 20, 2010", 6 pgs.

(Continued)

*Primary Examiner* — Craig Schneider
*Assistant Examiner* — William McCalister
(74) *Attorney, Agent, or Firm* — Schwegman, Lundberg & Woessner, P.A.

(57) ABSTRACT

Check valve assemblies and related methods are described. A valve assembly comprises a housing having at least a first inlet passage and an outlet passage. A flow channel is disposed within the housing, with at least a portion thereof extending inward from the first inlet passage. A first check member is disposed within the first inlet passage and is movable along the flow channel between a closed position in which the first check member is disposed against a first valve seat and an open position in which the first check member is spaced from the first valve seat. In varying examples, movement of the first check member from the closed position to the open position is unopposed. Optionally, the housing can include at least a second inlet passage wherein a second check member is disposed. In an example, the second check member is continuously biased toward a closed position.

20 Claims, 5 Drawing Sheets

U.S. PATENT DOCUMENTS

| | | |
|---|---|---|
| 6,378,420 B1 | 4/2002 | Savage et al. |
| 6,470,420 B1 | 10/2002 | Hospodor |
| 6,470,794 B2 | 10/2002 | Takahashi |
| 6,779,543 B2 | 8/2004 | Hollister et al. |
| 6,792,983 B2 * | 9/2004 | Allora ............ 141/98 |
| 6,964,163 B2 | 11/2005 | Landhuis |
| 6,971,401 B1 | 12/2005 | Carpenter |
| 7,740,023 B2 | 6/2010 | Zweber |
| 2004/0134537 A1 | 7/2004 | Noll et al. |
| 2008/0041452 A1 | 2/2008 | Zweber |

OTHER PUBLICATIONS

"U.S. Appl. No. 11/893,972, Response filed Feb. 2, 2010 to Non Final Office Action mailed Nov. 3, 2009", 13 pgs.

"U.S. Appl. No. 11/893,972, Non-Final Office Action mailed Nov. 3, 2009", 7 pgs.

* cited by examiner

VALVE ASSEMBLIES AND RELATED SYSTEMS AND METHODS

CROSS-REFERENCE TO RELATED AND PRIORITY APPLICATIONS

This application is a divisional of U.S. application Ser. No. 11/893,972, entitled "CHECK VALVE ASSEMBLIES AND RELATED METHODS," filed Aug. 17, 2007, which claims the benefit of priority, under 35 U.S.C. §119(e), to U.S. Provisional Patent Application Ser. No. 60/838,675, filed Aug. 18, 2006, which specifications are herein incorporated by reference.

TECHNICAL FIELD

This patent document pertains generally to valve assemblies for a fluid handling system. More particularly, but not by way of limitation, this patent document pertains to check valve assemblies for preventing backflow of fluid along a flow path and related methods.

BACKGROUND

Check valves are conventionally used in applications where it is desirable to allow a flow of fluid in one direction and to prevent flow in the reverse or "backflow" direction. For instance, a check valve assembly can be used to prevent the backflow of used or dirty oil from a fryer or filter station in an oil handling system to avoid the risk of contaminating fresh or clean oil and incurring potential health hazards.

To achieve this function, check valve assemblies typically have a movable check member which is seated against a valve seat in a valve inlet passage and/or a valve outlet passage when the check member is in a closed or shunted position. When the check member is unseated from the respective inlet or outlet passage seat, the check member is opened and a "forward" flow can be introduced into and through the valve.

A check member disposed in the valve inlet passage is typically constructed so that it is unseated only in response to a sufficient opening or "cracking" fluid pressure on an upstream side of the inlet passage. In contrast, a backflow on a downstream side of the inlet passage is ineffective to unseat the inlet check member and open the valve. Similarly, an outlet check member is constructed so that it is unseated only in response to sufficient opening or cracking fluid pressure on an upstream side of the outlet passage, whereby a backflow on a downstream side of the outlet passage is ineffective to unseat the outlet check member and open the valve. Generally, the requisite fluid pressure needed to open or crack a check member must be greater than a biasing closing pressure exerted by a resilient member engaged on a backside of the check member.

Overview

The present inventor has recognized, among other things, that one problem presented by currently used check valve assemblies is that the requisite fluid pressure needed upstream to open or crack the check member(s) of the valve is greater than what can be met with certain fluid system pumps. For instance, as a system pump becomes worn or degraded, the associated gears or pump housing no longer fit well together. As a result, air can easily slip through fitting gaps upon pump start-up thereby decreasing the fluid thrusting power of the system pump. The present inventor has further recognized that there exists an unmet need for a check valve assembly in which at least one check member thereof can move from a closed, seated position to an open position substantially unopposed, that is, without requiring much, if any, upstream fluid pressure to open or crack.

This patent document describes various valve assemblies comprising a housing having at least a first inlet passage and an outlet passage. A flow channel is disposed within the housing, with at least a portion of the channel extending inward from the first inlet passage. A first check member is disposed within the first inlet passage and is movable along the flow channel between a closed position in which the first check member is disposed against a first valve seat and an open position in which the first check member is spaced from the first valve seat. The movement of the first check member from the closed position to the open position is substantially unopposed, thereby allowing continuing operating of a fluid handling system despite being powered, at least in part, by a worn or degraded system pump. Optionally, the housing can include at least a second inlet passage wherein a second check member is disposed.

In Example 1, a valve assembly comprises a housing including at least a first inlet passage and an outlet passage; a flow channel disposed within the housing, at least a portion of the flow channel extending inward from the first inlet passage; and a first check member disposed within the first inlet passage, the first check member movable along the flow channel between a closed position in which the first check member is disposed against a first valve seat and an open position in which the first check member is spaced from the first valve seat, wherein movement of the first check member from the closed position to the open position is unopposed.

In Example 2, the valve assembly of Example 1 optionally comprises a second check member disposed within a second inlet passage of the housing, the second check member movable between a closed position in which the second check member is disposed against a second valve seat and an open position in which the second check member is spaced from the second valve seat.

In Example 3, the valve assembly of Example 2 optionally comprises a resilient member disposed about a common axis of the first and second valve seats, a resilient member first end operably engaged adjacent the first valve seat and a resilient member second end operably engaged with the second check member to bias the same against the second valve seat.

In Example 4, the valve assembly of at least one of Examples 2-3 is optionally configured such that a diameter of the first check member is less than a diameter of the second check member.

In Example 5, the valve assembly of Example 4 is optionally configured such that the resilient member includes a resilient coil spring and an inner diameter of the resilient coil spring is greater than the diameter of the first check member and less than the diameter of the second check member.

In Example 6, the valve assembly of Example 5 is optionally configured such that the first check member is configured move unopposed from the closed position to the open position within a lumen of the resilient coil spring.

In Example 7, the valve assembly of at least one of Examples 2-6 is optionally configured such that a cracking pressure of the first check member is less than a cracking pressure of the second check member.

In Example 8, the valve assembly of at least one of Examples 2-7 is optionally configured such that the first check member is configured to check fluid flow in a first direction, and the second check member is configured to check fluid flow in a second direction substantially opposite the first direction.

In Example 9, the valve assembly of at least one of Examples 2-8 is optionally configured such that the first check member is configured to operate independently of the second check member.

In Example 10, the valve assembly of at least one of Examples 1-9 optionally comprises a seal member disposed adjacent the first or second valve seat.

In Example 11, the valve assembly of at least one of Examples 1-10 is optionally configured such that a requisite cracking pressure of the first check member is less than approximately 0.5 psi.

In Example 12, the valve assembly of at least one of Examples 1-11 is optionally configured such that the first check member is sized and shaped to sealably engage with the first valve seat to limit fluid flow out of the first inlet passage.

In Example 13, a valve assembly comprises a housing having at least a first and a second inlet passage and an outlet passage, the inlet passages partially defining a flow channel within the housing; a first check member disposed in the first inlet passage, the first check member movable unopposed along the flow channel toward and away from a first valve seat; a second check member disposed in the second inlet passage, the second check member movable along the flow channel toward and away from a second valve seat; and a resilient member operably engaged with the second check member thereby urging the same against the second valve seat.

In Example 14, the valve assembly of Example 13 is optionally configured such that the first and second valve seats surround a common axis of the flow channel.

In Example 15, the valve assembly of at least one of Examples 13-14 is optionally configured such that the first check member is movable with a lumen of the resilient member.

In Example 16, the valve assembly of at least one of Examples 13-15 is optionally configured such that at least one of the first inlet passage, the second inlet passage, or the outlet passage include internal threads.

In Example 17, the valve assembly of at least one of Examples 13-16 is optionally configured such that at least one of the first or second check members includes a spherical shape.

In Example 18, a method comprises flowing fluid in a first direction through a first inlet passage of a housing, including moving a first check member disposed in the first inlet passage away from a first valve seat in a substantially unopposed manner; and checking fluid in a second direction opposite the first direction at the first inlet passage.

In Example 19, the method of Example 18 optionally comprises flowing fluid in a third direction through a second inlet passage of a housing, including moving a second check member disposed in the second inlet passage away from a second valve seat.

In Example 20, the method of Example 19 is optionally configured such that flowing fluid in the third direction includes flowing fluid in a direction substantially similar to the second direction.

In Example 21, the method of at least one of Examples 19-20 is optionally configured such that moving the second check member away from the second valve seat includes compressing at least a portion of a resilient member biased in opposition to such movement.

In Example 22, the method of at least one of Examples 19-21 is optionally configured such that flowing fluid through the first inlet passage includes flowing fluid at a first fluid pressure, and flowing fluid through the second inlet passage includes flowing fluid at a second fluid pressure greater than the first fluid pressure.

In Example 23, the method of at least one of Examples 18-22 is optionally configured such that moving the first check member away from the first valve seat in the substantially unopposed manner includes moving the first check member within a lumen of a resilient member.

Advantageously, the present valve assemblies and methods can provide for a simple and economical fluid handling system that may still function even as one or more pumps of a fluid handling system become worn or degraded. In addition, the present valve assemblies can be retrofitted within the design constraints of an already existing fluid handling system by being amenable to compact and large constructions, depending on the system's need(s). This retrofitability avoids the expense of realigning fluid lines to accommodate new valve assembly housings of different or increased dimensions. These and other examples, advantages, and features of the present assemblies and methods will be set forth in part in the following Detailed Description. This Overview is intended to provide an overview of subject matter of the present patent document. It is not intended to provide an exclusive or exhaustive explanation of the invention. The Detailed Description is included to provide further information about the present patent document.

BRIEF DESCRIPTION OF THE DRAWINGS

In the drawings, like numerals describe similar components throughout the several views. Like numerals having different letter suffixes represent different instances of similar components. The drawings illustrate generally, by way of example, but not by way of limitation, various embodiments discussed in the present document.

DETAILED DESCRIPTION

Fluid system pumps are typically started with air on both sides thereof. However, as pumps age over time, the associated gears or pump housing often become worn down or degrade so that they no longer fit well together. Due to air slipping through gaps in the gear-housing fitting, the system pump may have a hard time moving air upon start-up thereby decreasing the fluid thrusting power of the system pump. Consequently, the fluid pressure required to open or crack typical check valve assemblies (e.g., which have a cracking pressure dependent upon a size of an inlet check member and spring engaged therewith) downstream of the system pump can be unattainable.

To accommodate for the wear and degradation of fluid system pumps, yet still be retrofittable within currently used fluid handling systems, the present valve assemblies and methods include a check member movable from a closed position to an open position substantially unopposed. As a result of being movably unopposed from the closed to the open position, this check member of the valve assemblies can have a requisite cracking pressure of less than 1 psi, and in some cases less than 0.5 psi, such as approximately 0 psi.

Examples

Figure 1:
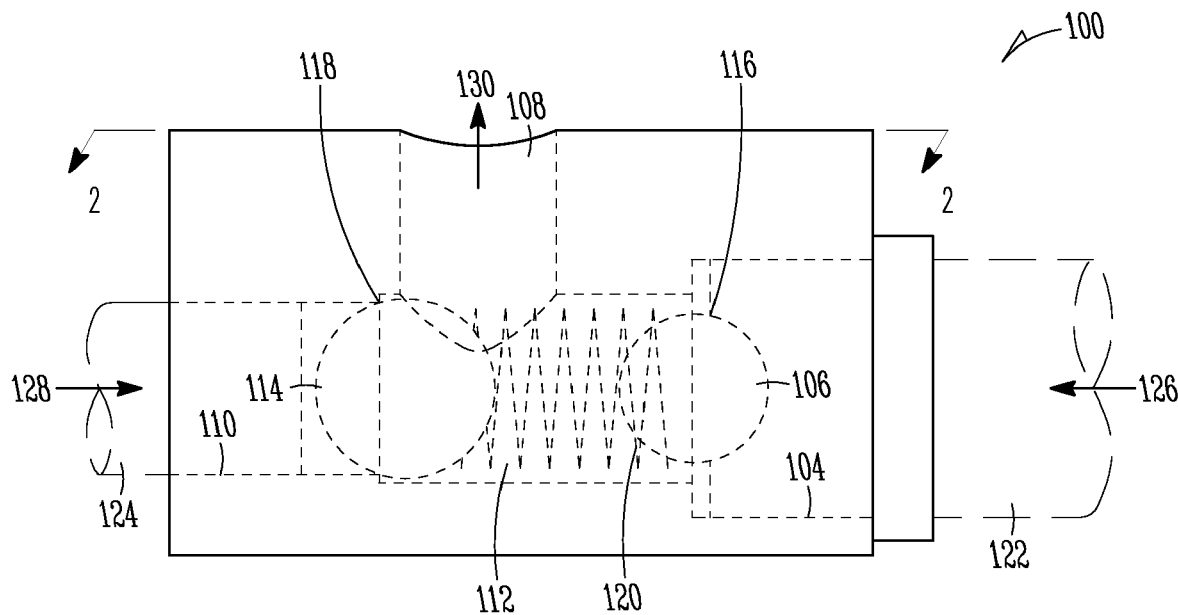
FIG. 1 is a side view of a check valve assembly and an environment in which the valve assembly can be used, the valve assembly including at least one check member moveable from a closed position to an open position substantially unopposed.

FIG. 1 is a side view of a check valve assembly 100 and an environment in which the valve assembly can be used. The valve assembly 100 includes a housing 102 having at least a first inlet passage 104 and an outlet passage 108. As shown, the valve assembly 100 can optionally include three or more passages, such as the first inlet passage 104, a second inlet passage 110, and the outlet passage 108. The three or more passages allow fluid flow between different combinations of the passages depending upon the function desired by a fluid handling system 500 (see, e.g., FIG. 5) in which the valve assembly 100 is used. An inner surface of the housing 102 can define a flow channel 112 between the inlet 104, 110 and outlet 108 passages.

A first check member 106 is disposed within the first inlet passage 104, while a second check member 114 is disposed in the optional second inlet passage 110. The first check member 106 is movable unopposed along portions of the flow channel 112 between a closed position in which the first check member is disposed against a first valve seat 116 and an open position in which the first check member is spaced form the first valve seat. The second check member 110, like the first check member 106, is movable along portions of the flow channel 112 between a closed position in which the second check member is disposed against a second valve seat 118 and an open position in which the second check member is spaced from the second valve seat. However, as shown, the second check member 114 can be continuously biased toward the closed position by a resilient member 120, such that movement to the open position is opposed and requires sufficient upstream fluid pressure to effectuate cracking movement. In their respective closed positions, both the first 106 and second 114 check members prevent backflow of fluid from exiting the valve assembly 100 via the inlet passages 104, 110.

In an example, the valve assembly 100 can be disposed between a lower pressure fluid line 122 and a higher pressure fluid line 124, as shown in phantom. To connect to the fluid lines 122, 124 to the valve assembly 100, the inlet 104, 110 and outlet 108 passages of the housing 102 can be internally threaded 250 (FIG. 2) with a thread size configured to mate with external threads of the fluid lines. Once connected and the check members 106, 114 are moved to an open position, the inlet passages 104, 110 can admit fluid flow into the housing 102 from a first 126 and second 128 direction, while the outlet passage 108 can discharge fluid flow in a third direction 130. In an example, the first 126 and second 128 flow directions are generally opposite. In an example, the third flow direction 130 is generally perpendicular to the first 126 and second 128 flow directions. Advantageously, little to no pressure is required in the lower pressure fluid line 122 to open or crack the first check member 106, as such member is moveable substantially unopposed.

Figure 2:
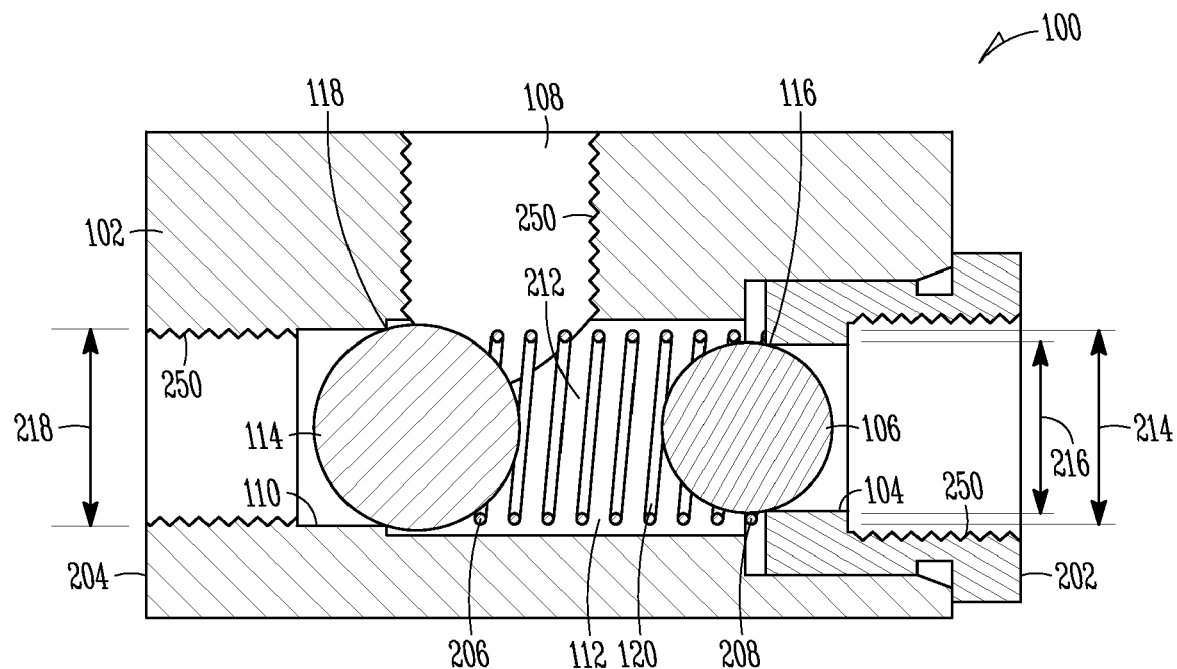
FIG. 2 is a cross-sectional view of a check valve assembly, such as along line 2-2 of FIG. 1, the valve assembly including at least one check member moveable from a closed position to an open position substantially unopposed.

FIG. 2 is a cross-sectional view of a check valve assembly 100, such as along 2-2 of FIG. 1. In this example, a valve housing 102 extends from a first end 202 to a second end 204. First 104 and second 110 inlet passages are respectively positioned at the first 202 and second 204 ends and form, at least in part, an internal flow channel 112 that fluidly connects the two ends and houses first 106 and second 114 check members. When installed, the first inlet passage 104 can be connected to a lower pressure fluid line 122 (FIG. 1) and the second inlet passage 110 can be connected to a higher pressure fluid line 124 (FIG. 1). Fluid inlet flow from the fluid lines 122, 124 can be stopped, directed, or left unimpeded by the check members 106, 114 before exiting through an outlet passage 108.

The first 106 and second 114 check members are movable between an open and a closed position. In the closed position, the check members 106, 114 abut against respective first 116 and second 118 valve seats. In an example, the first 116 and second 118 valve seats are co-axial with one another and are positioned on opposite ends of the housing 102. The first check member 106 is configured within the housing 102 to move from the closed position to the open position substantially unopposed. In an example, movement of the first check member 106 between the open and closed positions is guided by the flow channel 112, which may optionally include a material known to have low coefficient of friction with the first check member 106 allowing such check member to slidably move substantially unopposed. In the example shown, a resilient member 120 is provided within the flow channel 112 and positioned to continuously urge the second check member 114 toward a closed position on the second valve seat 118. As a result, movement of the second check member 114 from the closed position to the open position is opposed and requires upstream fluid pressure in the higher pressure fluid line 124 greater than a biasing closing pressure exerted by the resilient member 120 to open or crack, thereby allowing fluid flow therethrough.

The resilient member 120 can be disposed about a common axis of the first 116 and second 118 valve seats such that a resilient member first end 208 is operably engaged adjacent the first valve seat 116 and a resilient member second end 206 is operably engaged with a backend of the second check member 114. Optionally, the resilient member 120 includes a coil spring having a lumen 212 of diameter 214 therein. A diameter 216 of the first check member 106 can be less than the spring lumen diameter 214, while a diameter 218 of the second check member 114 can be greater than the spring lumen diameter 214. In such an example, movement of the first check member 106 to the open position is guided by the spring lumen 212 and movement of the second check member 114 to the open position is dependent on overcoming the opposing coil spring bias. In one example, the opening or cracking fluid pressure required to move the first check member 106 from the closed position is less than 1.0 psi, such as 0.5 psi or less, while the opening or cracking fluid pressure required to move the second check member 114 from the closed position is between about 3-5 psi.

The valve assembly 100 shown in FIG. 2 advantageously can be designed in compact or large constructions, depending on a fluid handling system's 500 (see, e.g., FIG. 5) sizing or needs. For instance, the ability of the resilient member 120 to control and guide movement of the both the first 106 and second 114 check members allows the valve assembly 100 to be manufactured using less number of parts, resulting in smaller constructions than would otherwise be possible. In addition, the size of the valve assembly 100 can be made large to accommodate large anticipated fluid line pressure or flow requirements of the fluid handling system 500.

Figure 3:
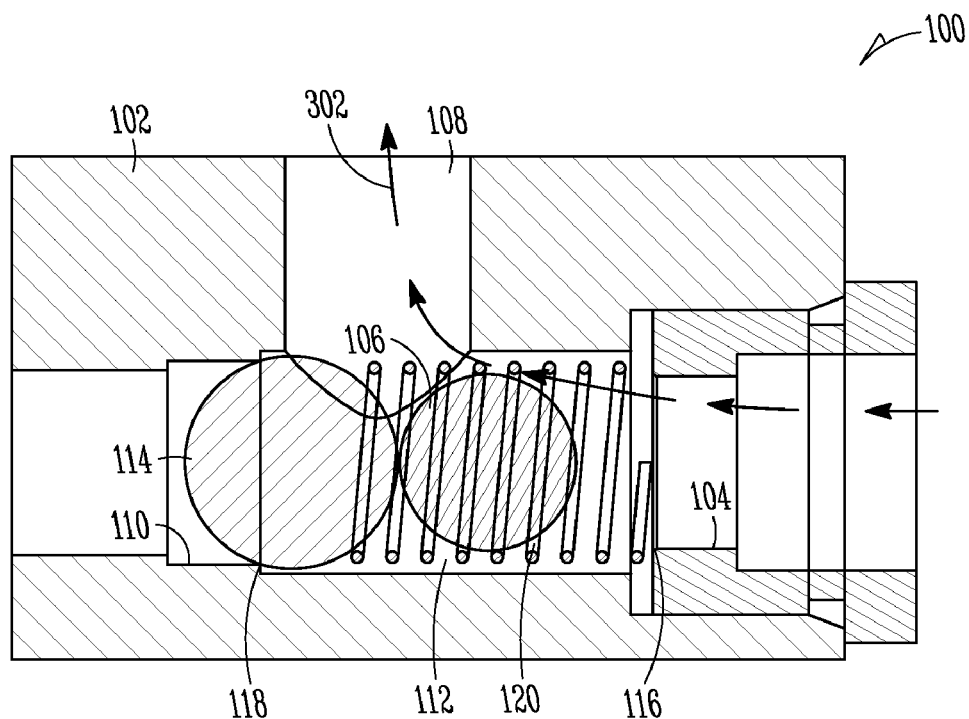
FIG. 3 is a cross-sectional view of a check valve assembly in which a first check member is in an open position and a second check member is in a closed position.
Figure 4:
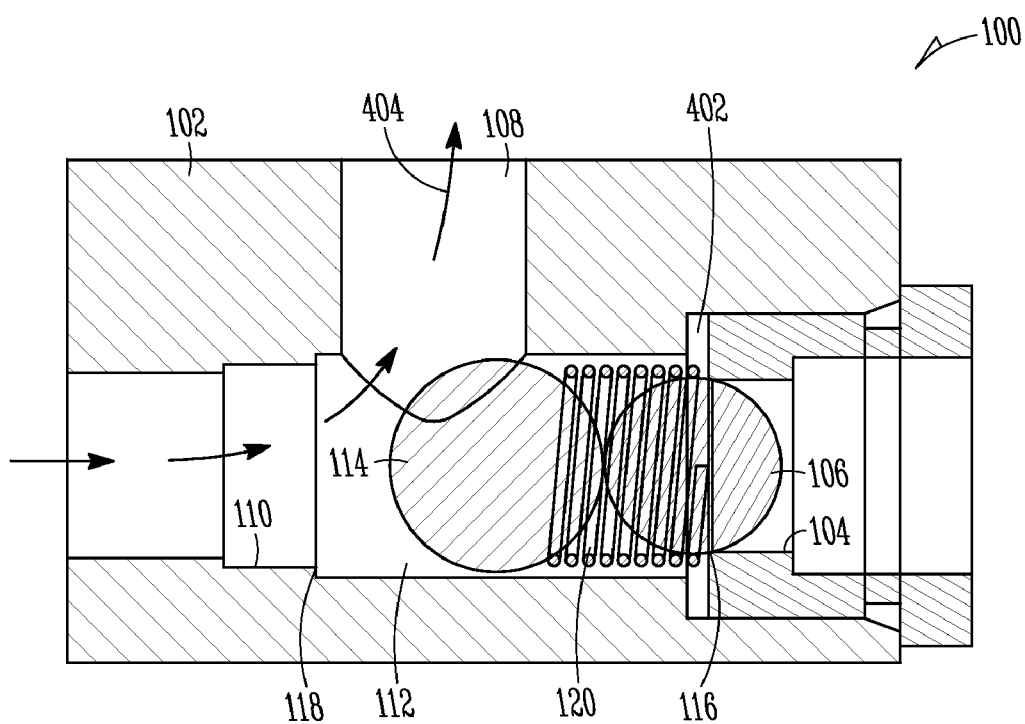
FIG. 4 is a cross-sectional view of a check valve assembly in which a first check member is in a closed position and a second check member is in an open position.

FIGS. 3-4 illustrates that a first 106 and second 114 check member of a valve assembly 100 can operate independently of one another. For instance, as shown in FIG. 3, the first check member 106 can be moved to an open position spaced from a first valve seat 116, while a second check member 114 can held against a second valve seat 118 by a resilient member 120. Similarly, as shown in FIG. 4, the second check member 114 can be moved to an open position spaced from the second valve seat 118, while the first check member 106 is disposed against the first valve seat 116. Due to the independent operational nature of the first 106 and second 114 check members, failure of either check member need not interfere with continued effective operation of the other check member.

In an example operation, a first inlet passage 104 of a housing 102 is ported for fluid flow form a lower pressure fluid line 122 (FIG. 1) and a second inlet passage 110 is ported from fluid flow from a higher pressure fluid line 124 (FIG. 1). If fluid flow is present in the lower pressure fluid line 122 (even at pressures less than 0.5 psi, such as close to 0 psi), but the fluid flow in the higher pressure fluid line 124 is non-existent or less than an opposing biasing force of the resilient member 120, then the valve assembly 100 can assume the check member positions shown in FIG. 3. In the example of FIG. 3, the first check member 106 has moved substantially unopposed along a flow channel 112 within the housing 102 from a seated, closed position to the open position shown due fluid flow in the lower pressure fluid line 122. As discussed above, the unopposed moveable nature of the first check member 106 allows low fluid flows, such as flows resulting from worn or degraded system pumps, to open or crack such check member, enter the flow channel 112 and ultimately exit through an outlet passage 108, as indicated by path 302. Fluid flow deviating from path 302 is prevented from exiting through the second inlet passage 110 due to the second check member 114 abutting against the second valve seat 118. Should fluid attempt to flow opposite path 302, the first check member will close, thereby preventing flow of fluid through the first inlet passage 104. In an example, the first check member 104 is configured to check fluid flow in a direction opposite the checking direction of the second check member 114.

If fluid flow is present in the higher pressure fluid line 124 and such fluid flow is higher than a biasing force of the resilient member 120, but no fluid flow is present in the lower pressure fluid line 122, then the valve assembly 100 can assume the check member positions shown in FIG. 4. In the example of FIG. 4, the second check member 114 has overcome the opposing biasing force of the resilient member 120 and moved along the flow channel 112 from a seated, closed position to the open position shown due sufficient fluid flow in the higher pressure fluid line 124. As discussed above, the overcoming fluid pressure in the higher fluid line 124 causes an opening or cracking of the second check member 114, allowing fluid flow to enter the flow channel 112 and ultimately exit through the outlet passage 108, as indicated by path 404. Fluid flow deviating from path 404 is prevented from exiting through the first inlet passage 104 due to the first check member 114 abutting against the first valve seat 116. Should fluid attempt to flow opposite path 404, the second check member will close, thereby preventing flow of fluid through the second inlet passage 110.

Optionally, a seal member 402 can be disposed adjacent one or both of the first 116 or second 118 valve seats between the seats and the first 106 or second 114 check members. When the check members 106, 114 are in their respective closed positions, the seal member 402 can be compressed against a leading surface of the check members improving backflow leak-tightness. In an example, the seal member 402 can be made of an elastomeric material, such as rubber. In an example, the first 116 and second 118 valve seats are annular in shape and are configured to receive a spherical or other rounded portion of the check members 106, 114, further increasing the sealing preventing backflow.

Figure 5:
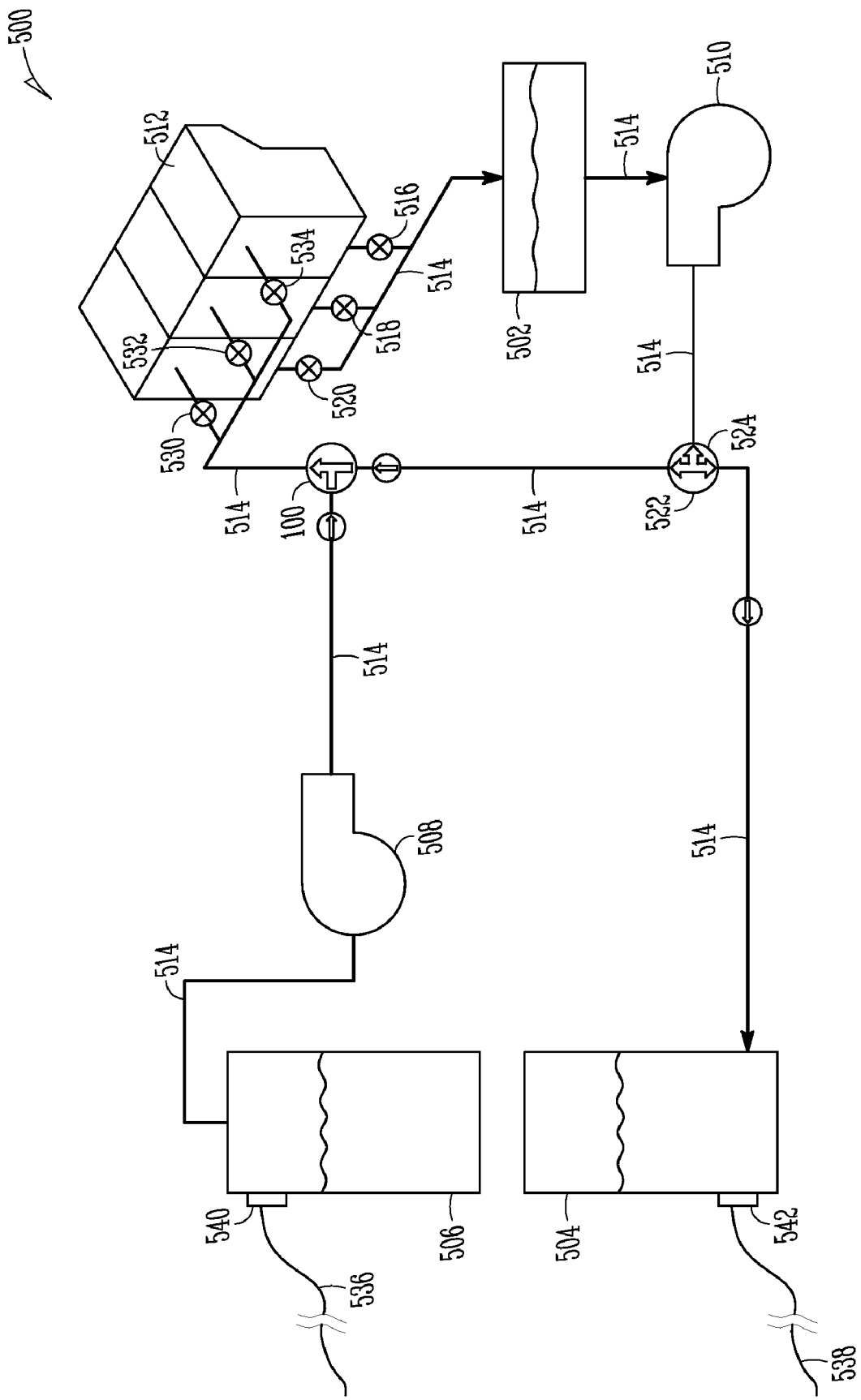
FIG. 5 is a schematic view of one or more stations, fluid lines, and valves of a fluid handling system configured for the storing and distributing of fresh oil, the filtering and recirculation of used oil, and the storing and elimination from the system of waste oil.

Among other uses, the present valve assemblies 100 and methods may find utility in automated cooking oil supply, filter, and disposal systems, such as the oil handing system 500 shown in FIG. 5. As shown, but as may vary, the system 500 comprises a filter station 502, a waste station 504, a supply station 506, a supply pump 508, a fryer/filter pump 510, a fryer station 512, and various valves manually or automatically controllable, such as via a valve panel controller. The stations are interconnected by fluid lines 514 capable of carrying the required flow of cooking oil between selected stations for the various purposes discussed below.

The filter station 502 comprises a filter to separate the cooking oil still amenable to reuse and the residue of carbon and food particles mixed with the used oil from the cooking process. Once filtered, the oil can then be recirculated to the fryer station 512 for reuse. One or more valves, such as drain ball valves 516, 518, 520 are positioned in the fluid lines 514 leading to the entrance of the filter station 502. The drain ball valves 516, 518, 520 can either be manually or electronically operated.

The waste station 504 comprises a waste receptacle to store waste cooking oil which has been degraded beyond appropriate further use in the cooking process. One or more valves, such as a solenoid valve 522 or a piloted solenoid valve 524 as discussed in commonly assigned Zweber, U.S. patent application Ser. No. 11/893,971, entitled "PILOTED SOLENOID VALVE ASSEMBLIES AND RELATED METHODS," filed on Aug. 17, 2007; can be positioned in a fluid line 514 leading to the entrance of the waste station 504. To remove oil from the system 500, a coupling attachment 542 of the waste station 504 is coupled to an outside line 538 leading to a remotely located storage facility, such as a tanker truck for immediate removal.

The supply station 506 comprises a supply storage tank to receive and store fresh cooking oil and provide the same to the fryer station 512 on an as needed basis. The supply pump 512 and one or more valves, such as a check valve assembly 100 including a check member movable to an open position substantially unopposed, are positioned in the fluid lines 514 leading from the exit of the supply station 506 and intersecting with the fluid lines 514 returning to the fryer station 512 from the solenoid valve 522 or piloted solenoid valve 524, as shown. To supply fresh oil to the system 500, an outside line 536 leading to a remotely located source of fresh oil, such as a tank truck or a remotely located storage tank, is coupled to a coupling attachment 540 of the supply station 506.

The supply 508 and fryer/filter 510 pumps function to deliver cooking oil along whatever path is designed by the appropriate opening and closing of the various system valves. More specifically, the supply pump 508 functions to deliver new oil from the supply station 506 to the fry station 512; whereas the fryer/filter pump 510 functions to either recirculate to the fryer station 512 reusable oil or dispose, via the waste station 504, oil that is beyond appropriate further use.

The fryer station 512 comprises one or more valves, such as return manifold ball valves 530, 532, 534, positioned in the fluid lines 514 leading to the entrance of the fryer station 512. The function of the fryer station 512 is to allow the proper metering of fresh or recycled filtered oil into one or more fryer vats of the fryer station 512.

In brief, the system 500 is designed to operate in close synchronization with the needs of a cooking equipment operator. These needs can vary from the introduction of fresh cooking oil into the system 500 and metering of such oil into the frying station 512, to the recycling/filtering of used cooking oil, and finally, to the complete removal of waste oil from the system 500. Cooking oil systems, such as oil handling system 500, are becoming quite common in fast food and other restaurants, which typically use large quantities of grease or cooking oil in frying during the preparation of food. These automated cooking oil systems advantageously eliminate operator handling of new and used oil and the many problems that are associated therewith. Unfortunately, lengthy use and debris in used oil takes its toll on at least the fryer/filter pump 510 of the system 500, causing the pump to become worn or degraded over time. This wearing and degrading results in the associated gears or pump housing of the fryer/filter pump 510 to no longer fit well together, thereby allowing air to slip through fitting gaps upon pump start-up and ultimately reducing fluid trusting pressure downstream of the system 500.

Figure 6:
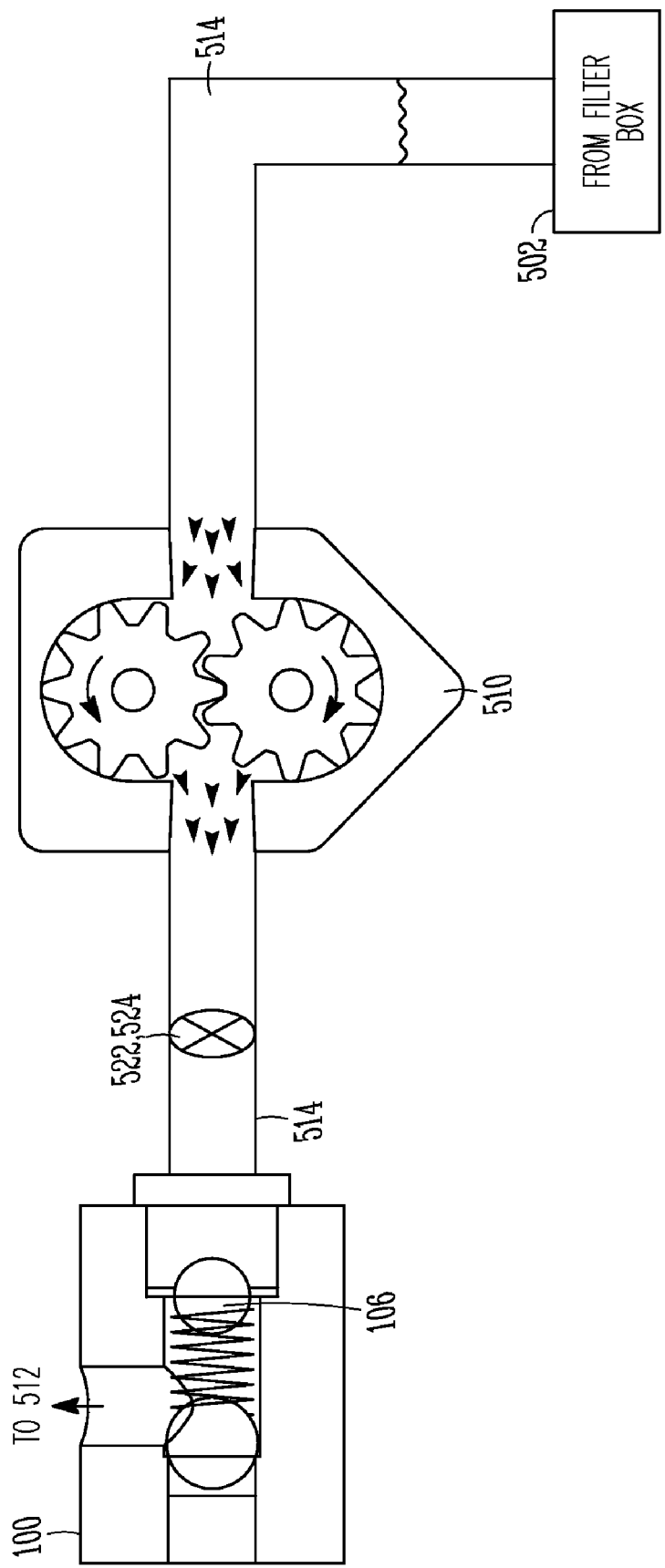
FIG. 6 is a schematic view of portions of the fluid handling system illustrated in FIG. 5, including a fryer/filter pump and system components associated therewith.

As shown in FIG. 6, the fluid pressure downstream of the fryer/filter pump 510 may be reduced to the point that a downstream check valve assembly 100 including a check member 106 movable to an open position substantially unopposed is needed. A fluid line 514 connects the filter station 502 and the check valve assembly 100 allowing return flow to the fryer station 512 (FIG. 5). Thus, when it is desired to place new or clean oil in the fryer station 512, one or more drain ball valves 516, 518, 520 (FIG. 5) can be opened and used, dirty oil may be pumped (via the fryer/filter pump 510), through a filter station 502 and into a solenoid 522 or piloted solenoid 524 valve. Based on an operator determination that the used, now filter oil pumped from the fryer station 512 is reusable, the system 500 (FIG. 5) can be placed in filter mode allowing the filtered oil to advance through the solenoid 522 or piloted solenoid valve 524 and into the fluid line 514 leading back to the fryer station 512. To prevent the filtered oil from combining with new oil, the check valve assembly 100 may be positioned as shown. The check valve assembly 100 in this example ensures the filtered oil and the new oil do not mix, while still allowing both such oils to flow to the fryer manifold as desired by the operator and attainable by the fryer/filter 510 and supply 508 (FIG. 5) pumps. In an example, components of the valve assembly 100 include materials that are corrosion-resistant to increase valve longevity when used with systems such as the oil handling system 500.

Figure 7:
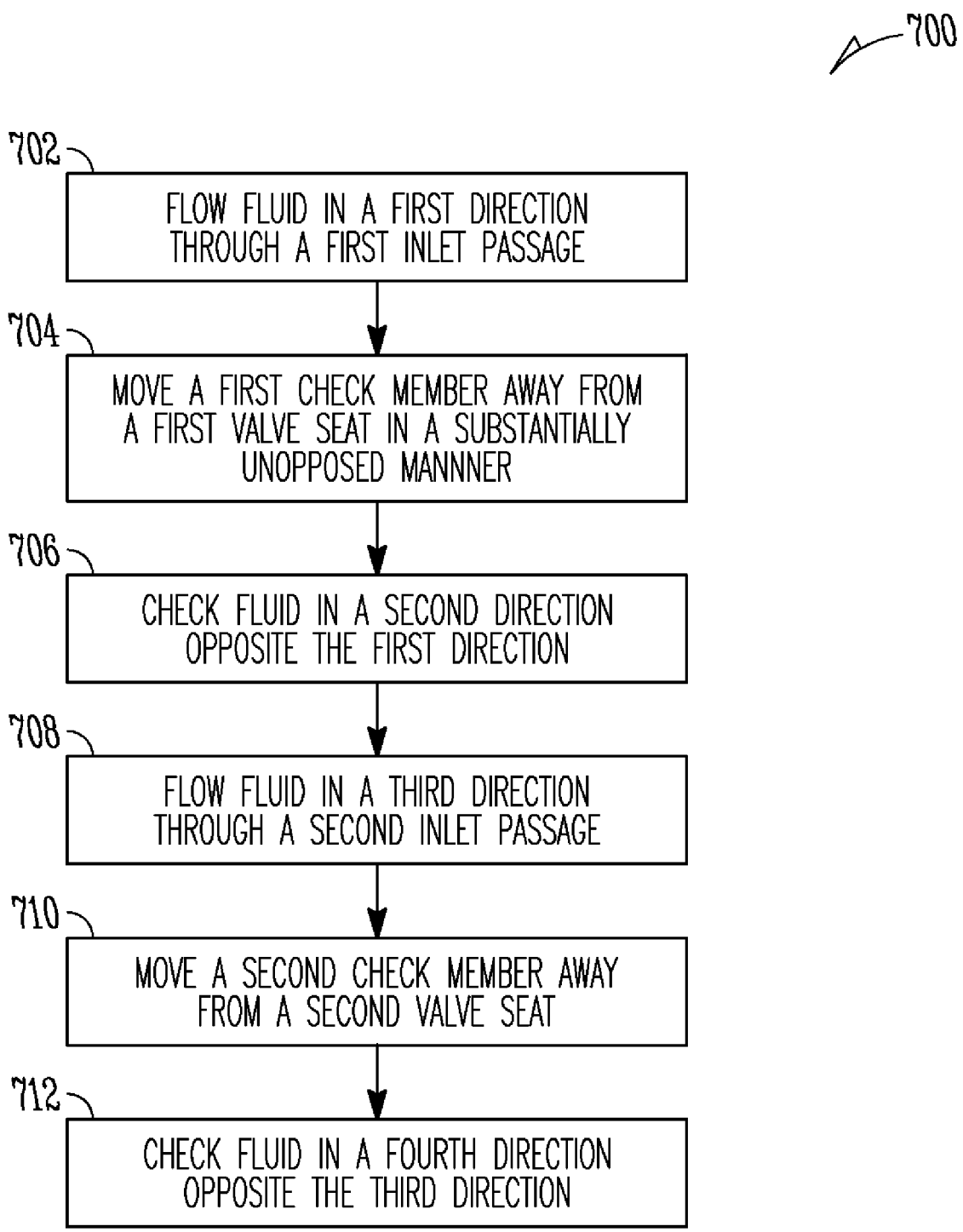
FIG. 7 is a block diagram of an example method of using a check valve assembly, the valve assembly including at least one check member movable from a closed position to an open position substantially unopposed.

FIG. 7 is a block diagram of an example method 700 of using a check valve in a fluid handling system. At 702, fluid is flowed in a first direction through a first inlet passage of a housing. In an example, the fluid flowing through the first inlet passage includes a fluid pressure between about 0-1 psi. Upon entering the first inlet passage, the fluid flow causes a first check member disposed in the first inlet passage to move away from a first valve seat in a substantially unopposed manner, at 704. This moving of the first valve member away from the first valve seat allows the fluid flow to enter into a fluid channel within the housing and ultimately through a housing outlet passage. In an example, the moving of the first valve member away from the first valve seat includes moving the first check member with a lumen of a resilient coil spring. At 706, fluid is checked in a second direction opposite the first direction at the first inlet passage. Once fluid flow passes the first check member, it is thereafter prevented from backflowing due to abutting of the first check member against the first valve seat.

At 708, fluid is flowed in a third direction through an optional second inlet passage of a housing. In an example, the fluid flowing through the second inlet passage includes a fluid pressure between about 3-5 psi. In another example, the fluid flowed in the third direction is flowed in a direction substantially similar to the direction at which fluid is checked by the first check member. Upon entering the second inlet passage, the fluid flow causes a second check member disposed in the second inlet passage to move away from a second valve seat in opposition to a biasing force of the resilient coil spring, at 710. In an example, this moving of the second check member away from the second valve seat causes portions of the resilient coil spring to compress. This moving of the second valve member away from the second valve seat allows the fluid flow to enter into the housing fluid channel and ultimately through the housing outlet passage. At 710, fluid is check in a fourth direction opposite the third direction at the second inlet passage. Once fluid flow passes the second check member, it is thereafter prevented from backflowing due to abutting of the second check member against the second valve seat.

CONCLUSION

Check valve assemblies and related methods are provided herein for maintaining operation of a fluid handling system, even as one or more system pumps become worn or degraded, via improved check member opening behavior. The valve assemblies comprise a housing having at least a first inlet passage and an outlet passage. A flow channel is disposed within the housing, with at least a portion of the channel extending inward from the first inlet passage. A first check member is disposed within the first inlet passage and is movable along the flow channel, or a spring lumen within the flow channel, between a closed position in which the first check member is disposed against a first valve seat and an open position in which the first check member is spaced from the first valve seat. The movement of the first check member from the closed position to the open position is substantially unopposed, thereby allowing continuing operation of a fluid handling system despite being powered by a worn or degraded pump. Optionally, the housing can include at least a second inlet passage wherein a second check member is disposed.

CLOSING NOTES

The above Detailed Description includes references to the accompanying drawings, which form a part of the Detailed Description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the designations "higher pressure fluid line" and "lower pressure fluid line" serve only to differentiate between the fluid lines. Situations may arise in which the pressure in the lower pressure fluid line is greater than that in the higher pressure fluid line.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more features thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. In addition, while the majority of this patent document discusses using the present valve assemblies and methods in a cooking oil supply, filter, and disposal system, the present valve assemblies and methods can also be used in other fluid systems where it is desired to prevent backflow of fluid along a certain flow path. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A valve assembly and a cooking oil handling system comprising:
   a housing including a first inlet passage and a second inlet passage and an outlet passage;
   a first flow channel disposed within the housing, at least a portion of the first flow channel extending inward from the first inlet passage to the outlet passage, and a second flow channel disposed within the housing, at least a portion of the second flow channel extending inward from the second inlet passage to the outlet passage;
   a first check member disposed within the first inlet passage, the first check member movable along the first flow channel between a closed position in which the first check member is disposed against a first valve seat and an open position in which the first check member is spaced from the first valve seat, wherein movement of the first check member from the closed position to the open position is unopposed;
   a second check member disposed within the second inlet passage, the second check member movable along the second flow channel between a closed position in which the second check member is disposed against a second valve seat and an open position in which the second check member is spaced from the second valve seat;
   a resilient member operably engaged with the second check member to bias the second check member against the second valve seat;
   a cooking oil frying station operably coupled to the outlet passage of the housing;
   a cooking oil filter station operably coupled to an outlet of the cooking oil frying station and operably coupled to the first inlet passage of the housing; and
   a cooking oil supply station operably coupled to the second inlet passage of the housing.

2. The valve assembly and oil handling system of claim 1, wherein the second inlet passage operably coupled to the cooking oil supply station operates at a relatively higher pressure and the first inlet passage operably coupled to the cooking oil filter station operates at a relatively lower pressure.

3. The valve assembly and oil handling system of claim 1, wherein the resilient member is disposed about a common axis of the first and second valve seats.

4. The valve assembly and oil handling system of claim 3, wherein the resilient member includes a resilient coil spring; and
   wherein an inner diameter of the resilient coil spring is greater than the diameter of the first check member and less than the diameter of the second check member.

5. The valve assembly and oil handling system of claim 4, wherein the first check member is configured to move unopposed from the closed position to the open position within a lumen of the resilient coil spring.

6. The valve assembly and oil handling system of claim 1, wherein a cracking pressure of the first check member is less than a cracking pressure of the second check member.

7. The valve assembly and oil handling system of claim 1, wherein a diameter of the first check member is less than a diameter of the second check member.

8. A valve assembly and a cooking oil handling system comprising:
   a housing having at least a first inlet passage and a second inlet passage and an outlet passage, the inlet passages partially defining a flow channel within the housing;
   a first check member disposed in the first inlet passage, the first check member movable unopposed along the flow channel toward and away from a first valve seat;
   a second check member disposed in the second inlet passage, the second check member movable along the flow channel toward and away from a second valve seat;
   a resilient member operably engaged with the second check member thereby urging the same against the second valve seat;
   a cooking oil frying station operably coupled to the outlet passage of the housing;
   a cooking oil filter station operably coupled to an outlet of the cooking oil frying station and operably coupled to the first inlet passage of the housing; and
   a cooking oil supply station operably coupled to the second inlet passage of the housing.

9. The valve assembly and oil handling system of claim 8, wherein the second inlet passage operably coupled to the cooking oil supply station operates at a relatively higher pressure and the first inlet passage operably coupled to the cooking oil filter station operates at a relatively lower pressure.

10. The valve assembly and oil handling system of claim 8, wherein the first and second valve seats surround a common axis of the flow channel.

11. The valve assembly and oil handling system of claim 8, wherein at least one of the first inlet passage, the second inlet passage, and the outlet passage include threads therewithin.

12. The valve assembly and oil handling system of claim 8, wherein at least one of the first and second check members includes a spherical shape.

13. The valve assembly and oil handling system of claim 8, wherein the first check member is movable within a lumen of the resilient member.

14. The valve assembly of claim 8, wherein a cracking pressure of the first check member is less than a cracking pressure of the second check member.

15. A method comprising:
   flowing filtered cooking oil from a cooking oil filtering station in a first direction through a first inlet passage of a valve housing, including moving a first check member disposed in the first inlet passage away from a first valve seat in a substantially unopposed manner, the filtered cooking oil flowing out of an outlet passage of the valve housing to a cooking oil frying station;
   checking the filtered cooking oil in a second direction opposite the first direction at the first inlet passage; and
   flowing cooking oil from a cooking oil supply station in a third direction through a second inlet passage of the housing, including moving a second check member disposed in the second inlet passage away from a second valve seat, the second check member movable toward and away from the second valve seat using a resilient member operably engaged with the second check member thereby urging the second check member against the second valve seat.

16. The method of claim 15, wherein the second inlet passage coupled to the cooking oil supply station operates at a relatively higher pressure and the first inlet passage coupled to the cooking oil filter station operates at a relatively lower pressure.

17. The method of claim 15, wherein moving the second check member away from the second valve seat includes compressing at least a portion of the resilient member biased in opposition to such movement.

18. The method of claim 15, wherein flowing filtered cooking oil through the first inlet passage includes flowing filtered cooking oil at a first fluid pressure, and flowing cooking oil through the second inlet passage includes flowing cooking oil at a second fluid pressure greater than the first fluid pressure.

19. The method of claim 15, wherein moving the first check member away from the first valve seat in the substantially unopposed manner includes moving the first check member within a lumen of the resilient member.

20. The method of claim 15, wherein a cracking pressure of the first check member is less than a cracking pressure of the second check member.

* * * * *